(12) United States Patent
Kikuchi

(10) Patent No.: US 9,626,282 B2
(45) Date of Patent: Apr. 18, 2017

(54) DATA PROCESSING APPARATUS AND DATA PROCESSING METHOD

(71) Applicant: Manami Kikuchi, Kanagawa (JP)

(72) Inventor: Manami Kikuchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/845,437

(22) Filed: Sep. 4, 2015

(65) Prior Publication Data

US 2016/0077954 A1    Mar. 17, 2016

(30) Foreign Application Priority Data

Sep. 17, 2014  (JP) ................................. 2014-188556
Feb. 9, 2015   (JP) ................................. 2015-023175

(51) Int. Cl.
  *G06F 11/36*    (2006.01)
  *G06F 9/455*    (2006.01)

(52) U.S. Cl.
  CPC ...... *G06F 11/3664* (2013.01); *G06F 9/45508* (2013.01)

(58) Field of Classification Search
  None
  See application file for complete search history.

(56) References Cited

U.S. PATENT DOCUMENTS 6,823,401 B2 * 11/2004 Feather, Jr. ......... H04L 12/2602
                                            710/15
7,554,685 B2    6/2009 Akiyoshi et al.
(Continued)

FOREIGN PATENT DOCUMENTS

GB    2364145      3/2004
JP    2001-197242  7/2001
(Continued)

OTHER PUBLICATIONS

Montesinos, Pablo, et al. "Capo: a software-hardware interface for practical deterministic multiprocessor replay." ACM Sigplan Notices. vol. 44. No. 3. ACM, 2009. Retrieved on [Dec. 23, 2016]. Retrieved from the Internet: URL<http://dl.acm.org/citation.cfm?id=1508254>.*

(Continued)

*Primary Examiner* — Thuy Dao
*Assistant Examiner* — Cheneca Smith
(74) *Attorney, Agent, or Firm* — IPUSA, PLLC

(57) ABSTRACT

A data processing apparatus includes a request receiving unit that receives a request from a program that causes a device to perform a predetermined process; an emulating unit that emulates a process performed by the device in accordance with the request; an instruction receiving unit that receives an instruction to change a status of the emulating unit from a user; a status changing unit that causes the emulating unit to change the status in accordance with the instruction to change the status; and a storing processing unit that stores, in response to generation of the request or generation of the instruction to change, information indicating the request or information indicating the instruction to change in a first storing unit, wherein the emulating unit emulates the process performed by the device under a status changed by the status changing unit.

16 Claims, 12 Drawing Sheets

(56) References Cited

U.S. PATENT DOCUMENTS

| | | | | |
|---|---|---|---|---|
| 7,945,657 B1* | 5/2011 | McDougall | ......... | G06F 11/3457 703/21 |
| 8,578,340 B1* | 11/2013 | Daudel | ............... | G06F 11/3636 710/266 |
| 8,788,959 B1* | 7/2014 | Ogami | ................... | G06F 1/3203 715/756 |
| 9,015,654 B2* | 4/2015 | Kaasila | ............... | G06F 11/3664 702/186 |
| 2010/0153924 A1* | 6/2010 | Andrews | ............. | G06F 11/3688 717/126 |
| 2011/0321007 A1* | 12/2011 | Marum | ..................... | G06F 8/65 717/113 |
| 2014/0282425 A1* | 9/2014 | Zhao | ................... | G06F 11/3688 717/127 |
| 2015/0046909 A1* | 2/2015 | Ligman | ............... | G06F 11/3688 717/131 |
| 2015/0178420 A1 | 6/2015 | Kikuchi | | |

FOREIGN PATENT DOCUMENTS

| | | |
|---|---|---|
| JP | 2004-185595 | 7/2004 |
| JP | 2008-226207 | 9/2008 |
| JP | 2010-218469 | 9/2010 |

OTHER PUBLICATIONS

Pokam, Gilles, et al. "Hardware and Software Approaches for Deterministic Multi-Processor Replay of Concurrent Programs." Intel Technology Journal 13.4 (2009).Retrieved on [Dec. 23, 2016]. Retrieved from the Internet: URL<http://eds.b.ebscohost.com/eds/pdfviewer/pdfviewer?sid=7574c9ed-2c34-481e-abfb-270cdfce3b78%40sessionmgr105&vid=1&hid=113>.*

* cited by examiner

FIG.5

| EVENT NAME | DESTINATION TO DELIVER | DELIVERING PARAMETER |
|---|---|---|
| REQ_*_JOB | JOB MANAGING UNIT, SYSTEM MANAGING UNIT | ALL |
| REQ_GET_*_JOB_STATE | JOB MANAGING UNIT | ALL |
| EMULATE_JAM_CREATE | SERVICE MANAGING UNIT | ALL |
| EMULATE_JAM_RECOVER | SERVICE MANAGING UNIT | ALL |
| .. | .. | .. |
| RES_* | RESPONSE GENERATING UNIT | ALL |
| .. | .. | .. |

| EVENT NAME | DESTINATION TO DELIVER | DELIVERING PARAMETER |
|---|---|---|
| REQ_*_JOB | JOB MANAGING UNIT, SYSTEM MANAGING UNIT | ALL |
| REQ_GET_*_JOB_STATE | JOB MANAGING UNIT | ALL |
| EMULATE_JAM_CREATE | SERVICE MANAGING UNIT | ALL |
| EMULATE_JAM_RECOVER | SERVICE MANAGING UNIT | ALL |
| : | : | : |
| RES_* | RESPONSE GENERATING UNIT | ALL |
| : | : | : |
| JOB_PRINT_COUNTER | STATUS CHANGING UNIT | ALL |
| SERVICE_JAM_ON | STATUS MONITORING UNIT | ALL |
| : | : | : |

```
SCENARIO A
1: UI: INSTRUCTION TO CHANGE STATUS
(GENERATE PAPER JAM WHEN 10 PAPERS ARE PRINTED)
2: UI: INSTRUCTION TO MONITOR STATUS (PAPER JAM)
3: EVENT: REQUEST TO PRINT (DOCUMENT A, 20 PAPERS, ···)
4: IF GENERATION OF PAPER JAM THEN INSTRUCTION TO CANCEL
PAPER JAM
```

FIG.13

| REQUEST TO REGISTER EVENT DELIVERING INFORMATION (JOB_PRINT_COUNTER, STATUS CHANGING UNIT) | REQUEST TO REGISTER EVENT DELIVERING INFORMATION (SERVICE_JAM_ON, STATUS MONITORING UNIT) | REQ_PRINT_JOB | RES_REQUEST_RECEIVED | JOB_PRINT_COUNTER | EMULATOR_JAM_CREATE | SERVICE_JAM_ON | EMULATE_JAM_RECOVER |
|---|---|---|---|---|---|---|---|

DATA PROCESSING APPARATUS AND DATA PROCESSING METHOD

BACKGROUND OF THE INVENTION

1. Field of the Invention

The present invention relates to a data processing apparatus and a data processing method.

2. Description of the Related Art

Among various devices, typically image forming apparatuses such as multifunction peripherals or the like, some of them include an application platform and are capable of mounting an application program (hereinafter, referred to as "application".) that uses an Application Program Interface (API) provided by the application platform. By making such an API open to public, not only manufactures that manufacture the devices but also third benders or the like outside the manufactures are capable of developing application.

It is desirable that a test for operations of application under development is performed using a device or the like. However, it is not economical to prepare a device for each developer (or engineer). Further, it is not efficient to use a single device by a plurality of developers. Thus, software is used that emulates, simulates or the like operations of hardware components, application platform or the like of the device. Hereinafter, such software is referred to as an "emulator". Further, hereinafter, emulates, simulates or the like is imply referred to as "emulates". For example, by installing an emulator in a Personal Computer (PC) or the like of each of the developers, each of the developers can efficiently perform a test or the like of the operations of application under development. Further, by preparing an emulator for a new model device, it is possible to develop the device itself and the application in parallel.

However, in a conventional emulator, it was difficult to change various statuses of a target device to emulate at desired timing. Thus, for example, it was difficult to perform a test of operations of application at various statuses such as a status in which a paper jam occurs in the device, a status in which running out of toner occurs in the device, a status in which running out of paper occurs in the device or the like. It can be considered that such problems similarly exist for devices other than image forming apparatuses.

PATENT DOCUMENT

[Patent Document 1] Japanese Laid-open Patent Publication No. 2004-185595

SUMMARY OF THE INVENTION

The present invention is made in light of the above problems, and provides a technique capable of easily replaying various statuses of a target device to emulate.

According to an embodiment, there is provided a data processing apparatus including a request receiving unit that receives a request from a program that causes a device to perform a predetermined process; an emulating unit that emulates a process performed by the device in accordance with the request; an instruction receiving unit that receives an instruction to change a status of the emulating unit from a user; a status changing unit that causes the emulating unit to change the status in accordance with the instruction to change the status; and a storing processing unit that stores, in response to generation of the request received by the request receiving unit or generation of the instruction to change received by the instruction receiving unit, information indicating the request or information indicating the instruction to change in a first storing unit, wherein the emulating unit emulates the process performed by the device under a status changed by the status changing unit.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of a structure of an event delivering information storing unit;

FIG. 8 is a view illustrating an example of a change of a stored content of the event delivering information storing unit;

FIG. 9 is a view illustrating an example of an evaluation scenario;

FIG. 13 is a view illustrating an example of information stored in a received event history storing unit.

DETAILED DESCRIPTION OF THE PREFERRED EMBODIMENTS

Figure 1:
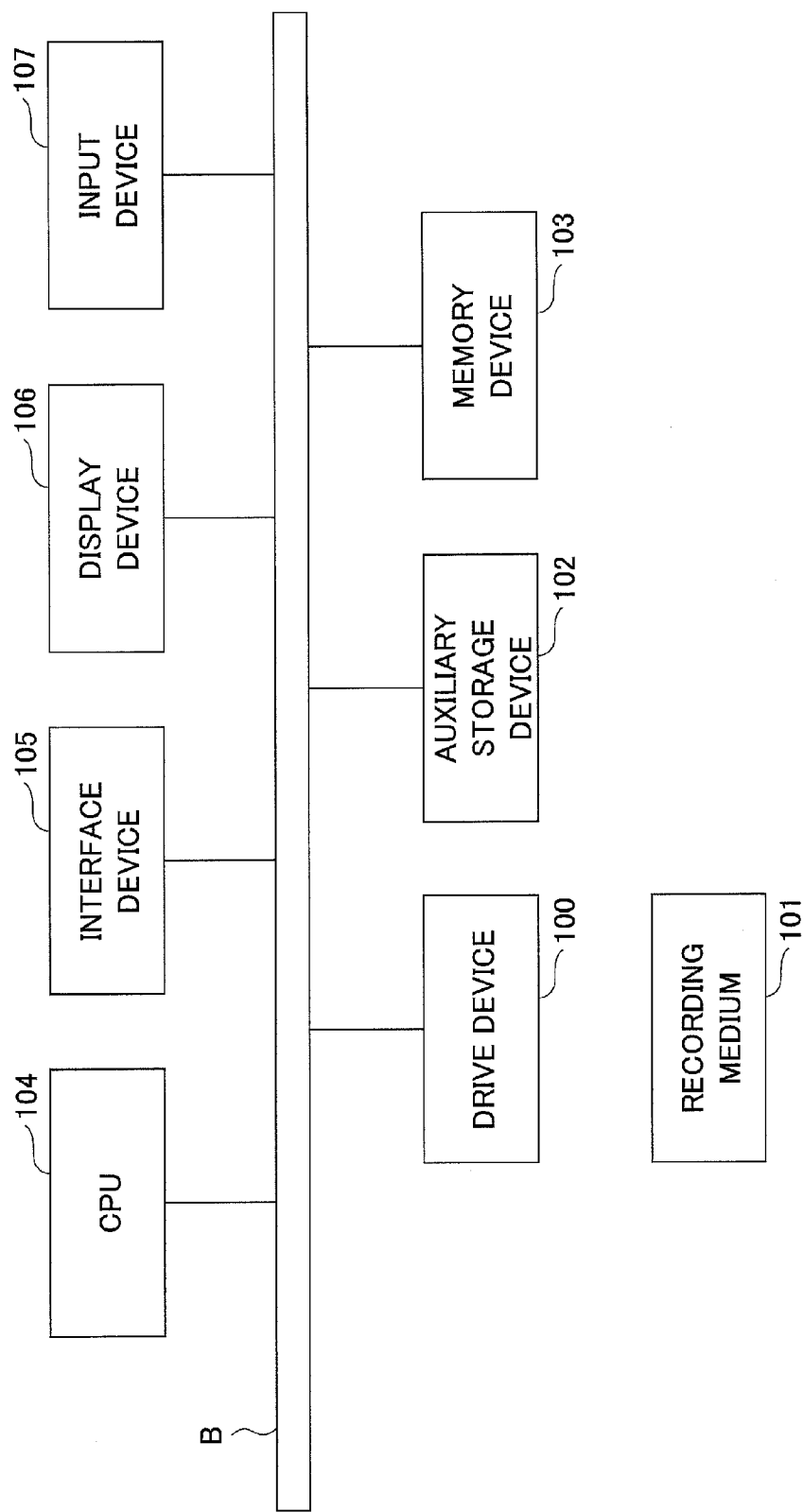
FIG. 1 is a view illustrating an example of a hardware structure of a data processing apparatus of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 1 is a view illustrating an example of a hardware structure of a data processing apparatus 10 of the first embodiment. The data processing apparatus 10 of FIG. 1 includes a drive device 100, an auxiliary storage device 102, a memory device 103, a CPU 104, an interface device 105, a display device 106, an input device 107 and the like that are connected with each other via a bus B.

A program that actualizes processes of the data processing apparatus 10 are provided by a recoding medium 101 such as a CD-ROM or the like. When the recoding medium 101 that stores the program is set in the drive device 100, the program is installed in the auxiliary storage device 102 from the recoding medium 101 via the drive device 100. However, the program is not necessarily installed by the recoding medium 101, and may be downloaded from another computer via a network. The auxiliary storage device 102 stores necessary files, data or the like in addition to the installed program.

Upon an instruction to activate a program, the memory device 103 reads out the program from the auxiliary storage device 102 and stores the program. The CPU 104 actualizes functions of the data processing apparatus 10 in accordance with the program stored in the memory device 103. The interface device 105 is used as an interface to connect to a network. The display device 106 displays Graphical User Interface (GUI) or the like by the program. The input device 107 is composed by a keyboard, a mouse and the like, and is used for inputting various operational instructions.

The data processing apparatus 10 may be a computer system that is an assembly of one or more devices and has the structure illustrated in FIG. 1.

Figure 2:
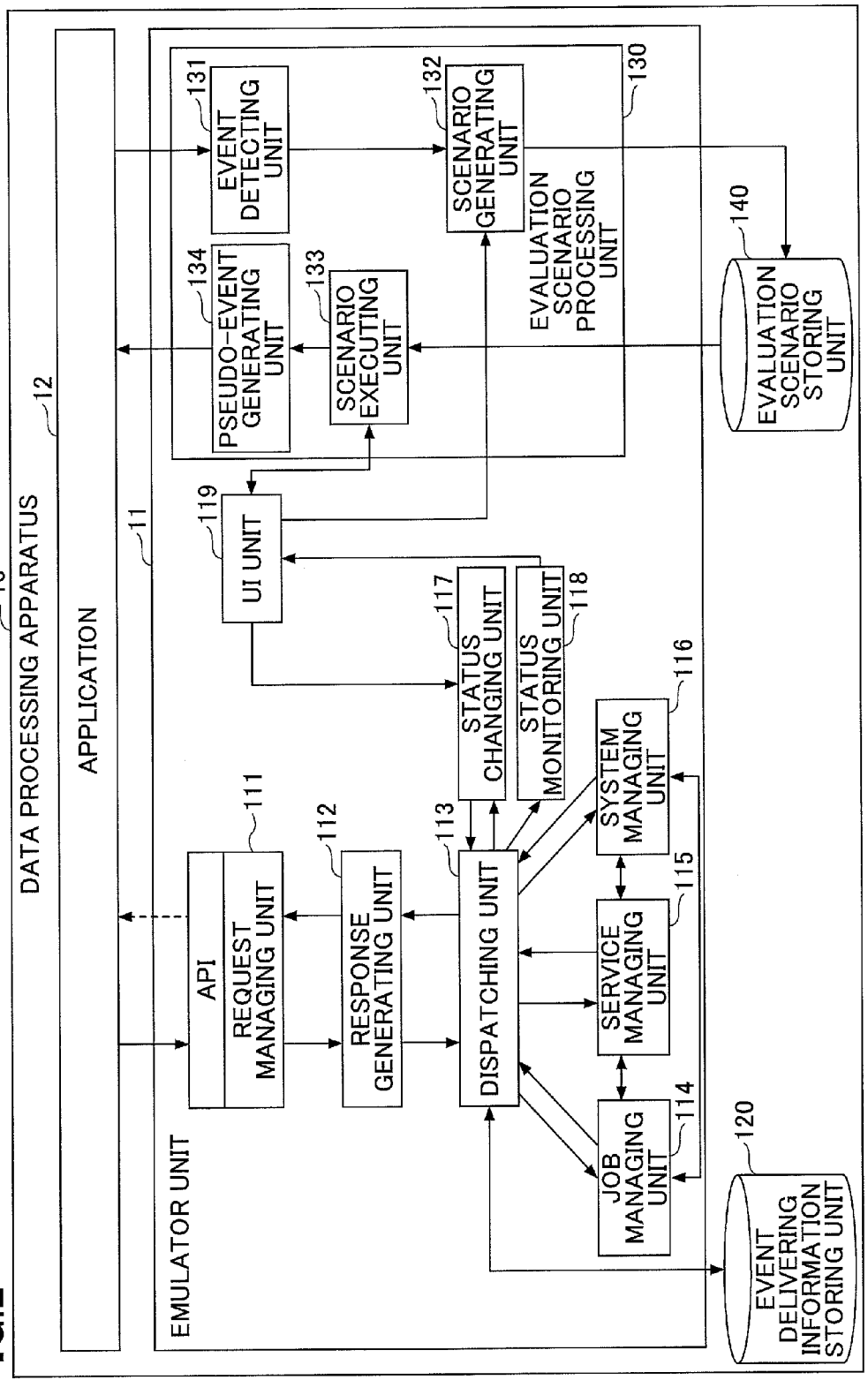
FIG. 2 is a view illustrating an example of a functional structure of the data processing apparatus of the first embodiment.

FIG. 2 is a view illustrating an example of a functional structure of the data processing apparatus of the first embodiment. In FIG. 2, the data processing apparatus 10 includes an emulator unit 11. Further, in the data processing apparatus 10 one or more application 12 are installed. Each of the application 12 is an application program capable of being operated on an application platform included in an image forming apparatus (hereinafter, referred to as a "target device".) for which the emulator unit 11 emulates. This means that the emulator unit 11 emulates (imitates) operations of the application platform of the target device, hardware components of the target device or the like. Thus, the emulator unit 11 is capable of providing an operating environment for the application 12 similar to an operating environment provided by the target device. The emulator unit 11 is actualized by processes performed by the CPU 104 in accordance with a program installed in the data processing apparatus 10. In this embodiment, "emulate" or "imitate" includes a meaning of "simulate".

In FIG. 2, the emulator unit 11 includes a request managing unit 111, a response generating unit 112, a dispatching unit 113, a job managing unit 114, a service managing unit 115, a system managing unit 116, a status changing unit 117, a status monitoring unit 118, a UI unit 119, an evaluation scenario processing unit 130 and the like. The emulator unit 11 further uses an event delivering information storing unit 120, an evaluation scenario storing unit 140 and the like. Each of these storing units may be actualized by the auxiliary storage device 102, a storage device that is connected to the data processing apparatus 10 via a network, or the like, for example.

The request managing unit 111 includes an Application Program Interface (API) that is the same as included in an application platform of the target device. The request managing unit 111 receives a request from the application 12 via the API. The API may be a function, a method, or a WebAPI. The WebAPI is an API that uses a HyperText Transfer Protocol (HTTP) communication. However, a communication protocol other than HTTP may be used.

The response generating unit 112 performs a process of generating a response to the request from the application 12. The response generating unit 112 notifies the request from the application 12 to the dispatching unit 113 as an event.

The dispatching unit 113 relays delivering and notifying of various events notified from the response generating unit 112, the job managing unit 114, the service managing unit 115, the system managing unit 116, the status changing unit 117 or the status monitoring unit 118, by referring to the event delivering information storing unit 120. The event is information regarding a phenomenon that is generated while the emulator unit 11 emulates the operations of the target device, or information indicating generation of the phenomenon. The event delivering information storing unit 120 stores information indicating a destination to deliver the event, for each of the kinds of the events. Hereinafter, such information is referred to as "event delivering information". Alternately, it can be said that the event delivering information is information indicating an event to be delivered to each of the units. As the dispatching unit 113 relays delivering of the event, a necessity can be reduced for each of the units (each module) to recognize the destination to deliver the event. As a result, when it is necessary to change a destination to deliver for an event, a necessity can be reduced to alter the module or the like that notified the event.

The job managing unit 114 emulates managing of execution of a job or the like at the target device. The job managing unit 114 includes a module, for each of the kinds of the jobs, that manages the kind of the job. For example, if the target device is capable of performing a copy job, a scan job, a send facsimile job, a print job and the like, the job managing unit 114 includes modules for the copy job, the scan job, the send facsimile job, the print job and the like, respectively. The job managing unit 114 notifies an event regarding a change of a status of a job.

The service managing unit 115 emulates a control mechanism of a hardware component (an engine part) of the target device that is used in accordance with execution of a job. The control mechanism may be actualized by a driver program corresponding to the hardware component, for example. The service managing unit 115 notifies an event regarding a change of a status of a hardware component of the target device, for example. Such a change of the status includes running out of toner, an occurrence of a paper jam, start or end of scan, start or end of print or the like.

The system managing unit 116 emulates managing of a status of the target device that changes independently from the execution of the job. For an example of such a status, a log-in status of a user, an energy saving status or the like may be raised. The system managing unit 116 notifies an event regarding a change of a such status.

The status changing unit 117 forcibly changes the status of the emulator unit 11 at timing designated by the user in response to a request from the UI unit 119. For example, the status changing unit 117 forcibly generates running out of toner, a paper jam or the like. Further, the status changing unit 117 forcibly sets the number of papers in a virtual paper feeding tray or forcibly sets information of a log-in user. The emulator unit 11 emulates the process that is executed by the target device under the status that is changed by the status changing unit 117.

The status monitoring unit 118 notifies an event generated at the emulator unit 11 to the UI unit 119.

The UI unit 119 provides a user interface. For example, the UI unit 119 controls the display device 106 to display a screen, and receives an input of an instruction to change the status of the emulator unit 11 via the screen. Further, the UI unit 119 notifies the event that is generated at the emulator unit 11 to the user via the screen.

The evaluation scenario processing unit 130 generates an evaluation scenario, performs the evaluation scenario and the like. The evaluation scenario is data in which an event indicating an instruction by the user (an instruction to change a status of the emulator unit 11 or the like) that is input via a screen provided by the UI unit 119, an event generated while the emulator unit 11 emulates the operation of the target device or the like are recorded in time series. For example, information regarding events that are generated from an instruction to start generating of an evaluation scenario to an instruction to terminate is recorded in a single evaluation scenario. Here, execution of the evaluation scenario means to replay the events recorded in the evaluation scenario.

In FIG. 2, the evaluation scenario processing unit 130 includes an event detecting unit 131, a scenario generating unit 132, a scenario executing unit 133, a pseudo-event generating unit 134 and the like.

The event detecting unit 131 detects an occurrence of an event regarding the application 12, and notifies the event to the scenario generating unit 132. As an example of the event occurred regarding the application 12, call of the API of the request managing unit 111 by the application 12 may be raised. The call of the API may be detected by an OS (Operating System) of the data processing apparatus 10, for example. Further, the event occurred regarding the application 12 may include an instruction to execute for the application 12 (pressing of an icon of the application 12, setting of set information for the application, for example).

The scenario generating unit 132 generates the evaluation scenario based on an event notified from the event detecting unit 131, an event, notified from the UI unit 119, indicating an instruction (an instruction to change the status of the emulator unit 11 or the like) by the user input via the screen provided by the UI unit 119, an event that is generated while the emulator unit 11 emulates the operation of the target device or the like. The generated evaluation scenario is stored in the evaluation scenario storing unit 140.

The scenario executing unit 133 replays or generates an event indicated by information based on the information recorded in the evaluation scenario selected as a target to be executed among one or more evaluation scenarios stored in the evaluation scenario storing unit 140. The pseudo-event generating unit 134 replays or generates an event regarding call of the API by the application 12, among events indicated by the information.

Here, the evaluation scenario processing unit 130 may not be included in the emulator unit 11. In other words, the evaluation scenario processing unit 130 may be provided independently from the emulator unit 11.

Here, for the job managing unit 114, the service managing unit 115 and the system managing unit 116, high real-time processing is necessary in the target device. Thus, specific events of each of these modules may be directly notified.

Figure 3:
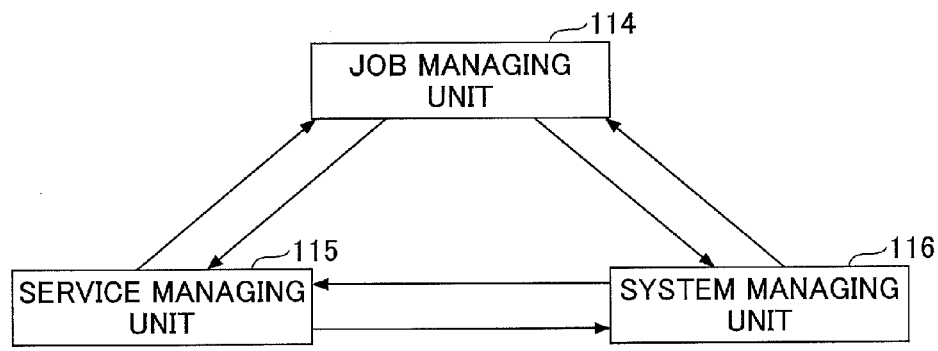
FIG. 3 is a view illustrating a manner in which events are directly notified between modules.

FIG. 3 is a view illustrating a manner in which events are directly notified between modules. As illustrated in FIG. 3, events that need real-time processing in the target device may be directly notified without passing through the dispatching unit 113, for example. With this configuration, the operation of the emulator unit 11 can be made more similar to that of the target device. In FIG. 3, each arrow indicates an event.

Figure 4:
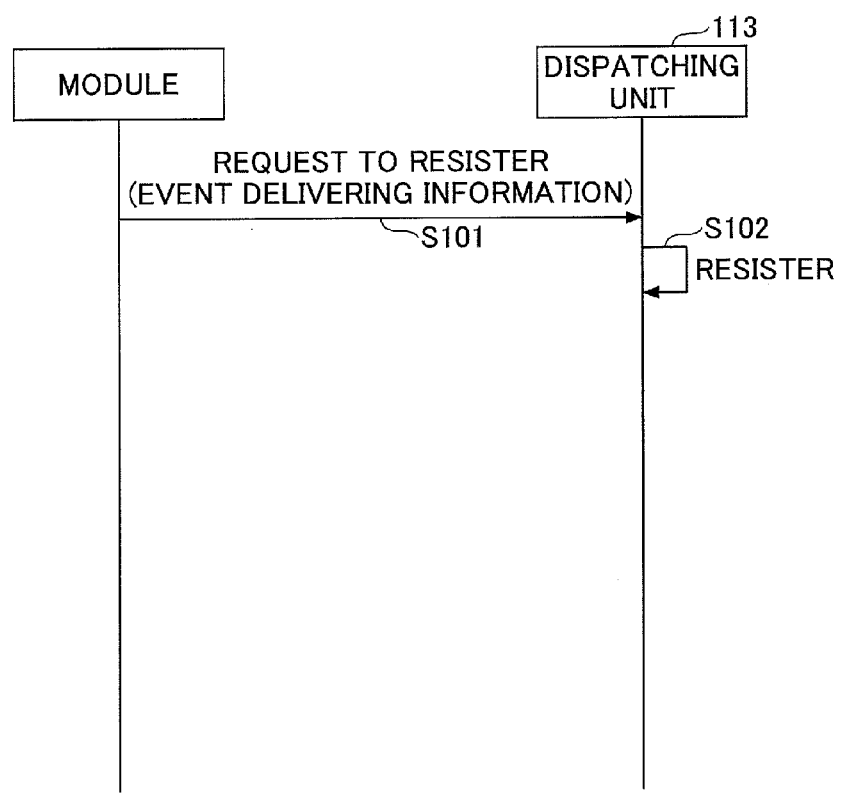
FIG. 4 is a sequence diagram for explaining an example of process steps of a registering process of event delivering information.

Hereinafter, process steps performed by the data processing apparatus 10 are explained. FIG. 4 is a sequence diagram for explaining an example of process steps of a registering process of event delivering information. The module illustrated in FIG. 4 is each of the job managing unit 114, the service managing unit 115, the system managing unit 116 and the response generating unit 112. For example, the process of FIG. 4 is performed when activating the respective module.

In step S101, the module sends a request of registering event delivering information including identification data of the module and identification data of an event (hereinafter, referred to as a "event name".) to be delivered to the module, to the dispatching unit 113. The dispatching unit 113 resisters (stores) the event delivering information included in the request in the event delivering information storing unit 120 (S102).

FIG. 5 is a view illustrating an example of a structure of the event delivering information storing unit 120. In FIG. 5, each record of the event delivering information storing unit 120 stores an event name, a destination to deliver, a delivering parameter and the like in association with each other.

The event name is an event name of an event to be delivered. The destination to deliver is identification data of a destination to which the event specified by the event name is to be delivered (in other words, the unit that has requested the notification of the event). The delivering parameter is a parameter, among parameters attached to the event, that is to be delivered with the event to the destination to deliver. "ALL" means that all of the parameters are to be delivered. The delivering parameter is a component of the event delivering information and is included in the request of registering from each module.

As illustrated in FIG. 5, for the event name, it may be possible to designate a regular expression. For example, "REQ_*_JOB" indicates a set of "REQ_COPY_JOB", "REQ_SCAN_JOB", "REQ_FAX_JOB", "REQ_PRINT_JOB" and the like. "REQ_*_JOB" indicates a request of performing a kind of a job identified by a part "*". Further, "REQ_GET_*_JOB_STATE" indicates a request of obtaining a status of a kind of a job identified by a part "*". Here, the event name starting from "REQ" is an event name of an event (hereinafter, referred to as a "request event".) indicating a request that is notified by the request managing unit 111 in response to a request from the application 12. Meanwhile, the event name starting from "RES" is an event name of an event (hereinafter, referred to as a "response event".) that is notified as a response to the request event.

In FIG. 5, it is illustrated that "REQ_*_JOB" and "REQ_GET_*_JOB_STATE" are delivered to the job managing unit 114. In other words, it is illustrated that the job managing unit 114 requests to receive "REQ_*_JOB" and "REQ_GET_*_JOB_STATE". This is because performing of the job and the status of the job are managed by the job managing unit 114, it is necessary to deliver "REQ_*_JOB" and "REQ_GET_*_JOB_STATE" to the job managing unit 114.

Further, it is illustrated that "RES_*" is delivered to the response generating unit 112. In other words, it is illustrated that the response generating unit 112 requests to receive "RES_*". This is because the response generating unit 112 generates information indicating a response to a request from the application (hereinafter, referred to as "response information".) based on the response event, it is necessary to deliver "RES_*" to the response generating unit 112.

Further, "EMULATE_JAM_CREATE" is an event name of an event indicating an instruction to generate a pseudo or virtual paper jam status (an instruction to transit to a paper jam status)(hereinafter, referred to as a "paper jam generating instruction event".). "EMULATE_JAM_RECOVER" is an event name of an event indicating an instruction to cancel the pseudo or virtual paper jam status (an instruction to recover from the paper jam status) (hereinafter, referred to as a "paper jam canceling instruction event".). In FIG. 8, it is illustrated that the paper jam generating instruction event and the paper jam canceling instruction event are delivered to the service managing unit 115. In other words, it is illustrated that the service managing unit 115 requests to receive the paper jam generating instruction event and the paper jam canceling instruction event. This is because generating of the pseudo or virtual paper jam status is actualized by the service managing unit 115.

When two or more modules request to register the event delivering information specified by the same event name, the two or more modules are registered in association with the event name. In other words, one event may be delivered to a plurality of modules. For example, in FIG. 5, the system managing unit 116 is also set as the destination to deliver in addition to the job managing unit 114 for "REQ_*_JOB". This means that the system managing unit 116 also requests to receive "REQ_*_JOB". For example, when the emulator unit 11 is at an energy saving status, it is necessary to recover the emulator unit 11 from the energy saving status when performing the job. Thus, it is necessary to deliver "REQ_*_JOB" to the system managing unit 116.

Here, there is a case that a notification of an event becomes necessary or unnecessary for a module during the operation of the emulator unit 11. For example, for the job managing unit 114, when there is a job being performed exists or a job being spooled exists, it is necessary to receive an event that is notified from the service managing unit 115, however, when such a job does not exist, it is unnecessary to receive the event. In such a case, the job managing unit 114 may send a request of registering event delivering information regarding an event that is necessary to be delivered when the corresponding job occurs, to the dispatching unit 113. Further, when the job does not exist anymore, the job managing unit 114 may send a request of releasing the registration of event delivering information regarding an event that is unnecessary to be delivered, to the dispatching unit 113. The dispatching unit 113 deletes the record regarding the request of releasing the registration from the event delivering information storing unit 120.

In other words, registration or deletion of the event delivering information may be performed at desired timing by each of the modules. With this configuration, the dispatching unit 113 is capable of delivering an event necessary for each of the modules.

The status changing unit 117 and the status monitoring unit 118 basically request registration of the event delivering information to the dispatching unit 113 in response to an instruction by the user. However, when there exists an event that is necessary for actualizing the function of the status changing unit 117 or the status monitoring unit 118 without an instruction by the user, the status changing unit 117 or the status monitoring unit 118 may be included as the module illustrated in FIG. 4.

Notification of an event and a response to the event may not necessarily be performed asynchronously. For example, an event may be notified to each of the modules by call of a function, a method or the like.

Figure 6:
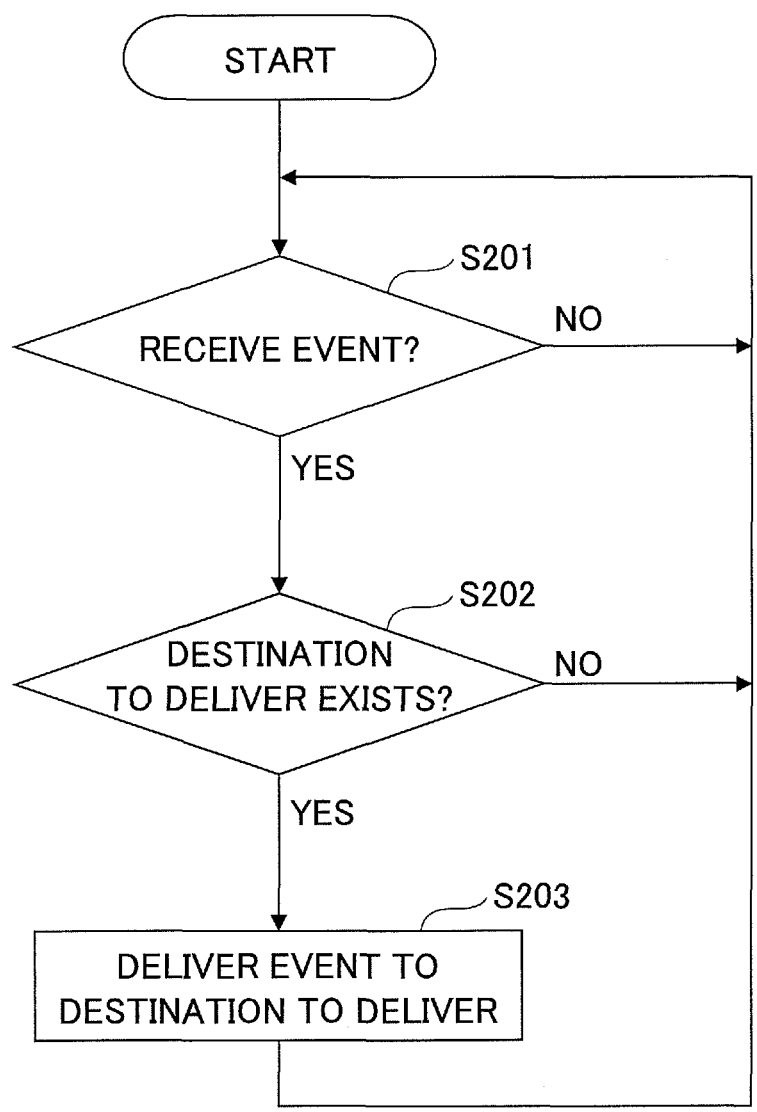
FIG. 6 is a flowchart for explaining an example of process steps of an event delivering process.

Subsequently, a delivering process of an event by the dispatching unit 113 is explained. FIG. 6 is a flowchart for explaining an example of process steps of the event delivering process.

The dispatching unit 113 waits for receiving an event from each of the modules of the response generating unit 112, the job managing unit 114, the service managing unit 115 and the system managing unit 116 (S201). When an event from either of the modules is received (Yes of S201), the dispatching unit 113 determines an existence of a destination to deliver for the event by referring to the event delivering information storing unit 120 (FIG. 5) (S202). Specifically, the dispatching unit 113 searches a record including an event name included in the event from the event delivering information storing unit 120. When the record including the event name included in the event exists, the dispatching unit 113 determines that the destination to deliver for the event exists. When the record including the event name included in the event does not exist, dispatching unit 113 determines that the destination to deliver for the event does not exist.

When the destination to deliver exists (Yes of S202), the dispatching unit 113 delivers the event to the module specified based on the destination to deliver detected in step S202 (S203). Further, among parameters included in the event, the parameter corresponding to the delivering parameter of the record is also delivered to the module.

On the other hand, when the destination to deliver does not exist (No of S202), the dispatching unit 113 does not deliver the event.

Figure 7:
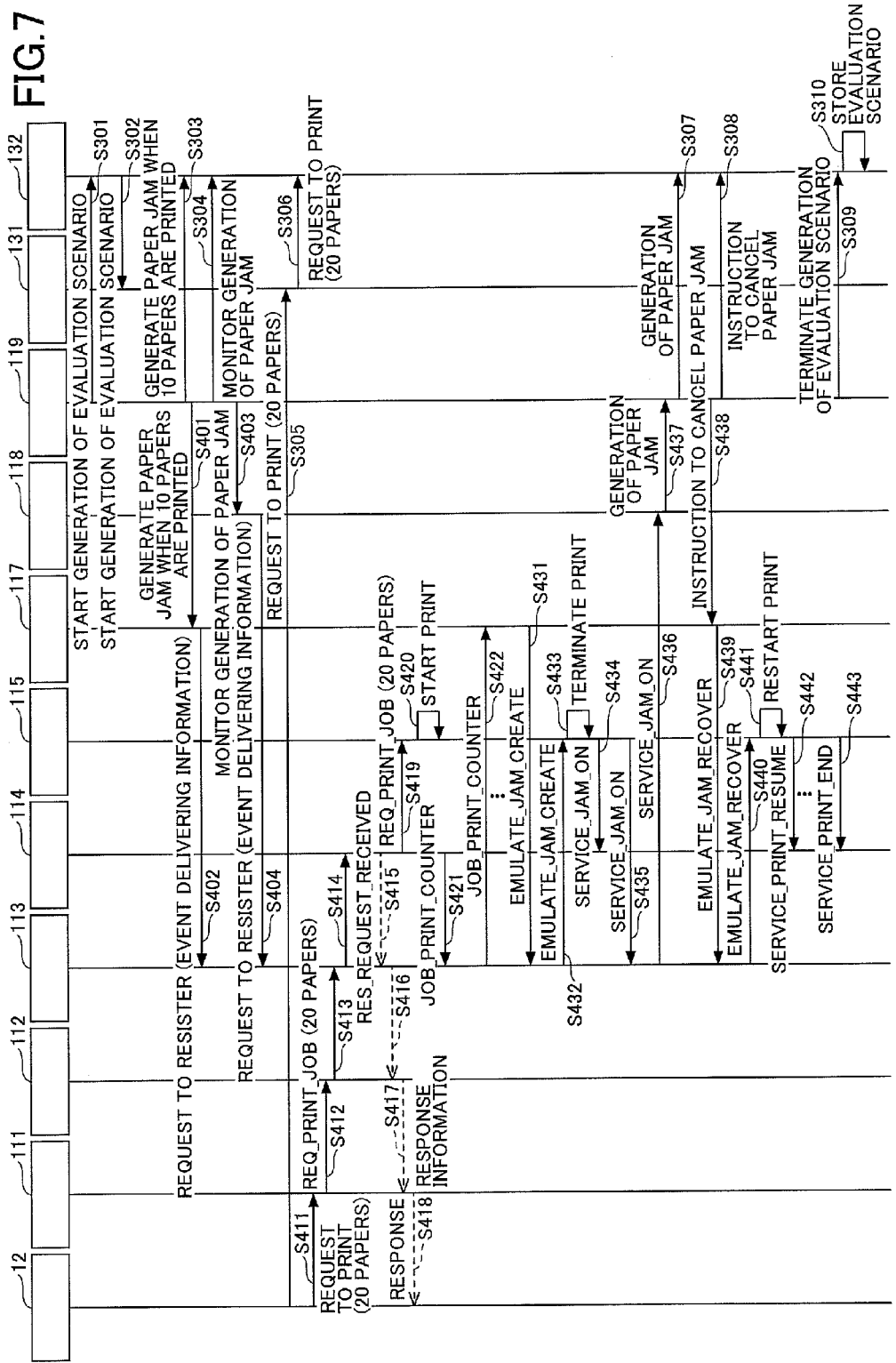
FIG. 7 is a sequence diagram for explaining an example of process steps that are performed when performing a test of an operation of application to generate an evaluation scenario of the first embodiment.

Subsequently, process steps that are performed when performing a test of the operation of the application 12 using the emulator unit 11 are explained. FIG. 7 is a sequence diagram for explaining an example of process steps that are performed when performing a test of the operation of the application for generating an evaluation scenario of the first embodiment. In FIG. 7, different series of step numbers are given for steps (S301 to S310) regarding the evaluation scenario processing unit 130 and steps (S401 to S443) not regarding the evaluation scenario processing unit 130, for convenience. Further, although boxes of units are given only numerals and names of the units are not illustrated in the boxes in FIG. 7, the boxes with numerals correspond to the units as illustrated in FIG. 2 and described in the specification.

For example, when an instruction to start generating of an evaluation scenario is input by the user via the screen displayed on the display device 106, the UI unit 119 notifies the instruction to start generating of an evaluation scenario to the scenario generating unit 132 (S301). The instruction to start may include a name of the evaluation scenario (hereinafter, referred to as "scenario name".), for example. Upon receiving the notification of the instruction to start, the scenario generating unit 132 stores the scenario name included in the instruction to start in the memory device 103, for example. Subsequently, the scenario generating unit 132 notifies the instruction to start to the event detecting unit 131 (S302). In response to the instruction to start, the event detecting unit 131 starts to monitor an event regarding the application 12.

Subsequently, upon receiving an instruction by the user to forcibly change the status of the emulator unit 11 via the screen displayed on the display device 106, the UI unit 119 notifies an event indicating the instruction to the scenario generating unit 132 (S303), for example. In the instruction, it is possible to designate timing to change the status. FIG. 7 illustrates an example in which it is instructed to generate a paper jam (to change to a paper jam status) when 10 papers are printed. The scenario generating unit 132 stores information indicating the event in the memory device 103 as a target to record in the evaluation scenario, for example. This means that the information indicating the instruction to generate a paper jam (to change to a paper jam status) when 10 papers are printed is stored as a target to record in the evaluation scenario.

Subsequently, the UI unit 119 notifies the instruction to the status changing unit 117 (S401).

The status changing unit 117 sends, in response to the instruction, a request of registering event delivering information of the event to the dispatching unit 113 such that an event for detecting or specifying the designated timing is notified to the status changing unit 117 itself (S402). Specifically, a request of registering event delivering information of a print counter event ("JOB_PRINT_COUNTER") is sent to the dispatching unit 113. The print counter event is an event that is notified from the job managing unit 114 every time the value of the print counter increases. The print counter means a storing area in which the accumulated number of printed papers are stored in the target device. Here, an event name that starts from "JOB" indicates an event that is notified from the job managing unit 114.

Subsequently, upon receiving a monitoring instruction of a status of the emulator unit 11 via the screen displayed on the display device 106, the UI unit 119 notifies an event indicating the instruction to monitor to the scenario generating unit 132, for example (S304). FIG. 7 illustrates an example in which it is instructed to monitor generation of a paper jam. The scenario generating unit 132 stores information indicating the event in the memory device 103 as a target to record in the evaluation scenario, for example. This means that the information indicating the instruction to monitor the generation of a paper jam is stored as a target to record in the evaluation scenario.

Subsequently, the UI unit 119 notifies the instruction to monitor to the status monitoring unit 118 (S403).

The status monitoring unit 118 sends, in response to the instruction to monitor, a request of registering event delivering information of the event to the dispatching unit 113 such that an event for detecting or specifying the generation of a paper jam is notified to the status monitoring unit 118 itself (S404). Specifically, a request of registering event delivering information of a paper jam generating event ("SERVICE_JAM_ON") is sent to the dispatching unit 113. The paper jam generating event is an event that is notified from the service managing unit 115 when a paper jam is generated. Here, an event name that starts from "SERVICE" indicates an event that is notified from the service managing unit 115.

As the result of the above processes, the stored content of the event delivering information storing unit 120 is changes as illustrated in FIG. 8, for example.

FIG. 8 is a view illustrating an example of a change of a stored content of the event delivering information storing unit. In FIG. 8, a record of "JOB_PRINT_COUNTER" and a record of "SERVICE_JAM_ON" are newly added.

Referring back to FIG. 7, subsequently, when an instruction to the application 12 by the user is input, the application 12 performs a process by following logics implemented in the application 12. For example, the application 12 sends a HTTP request indicating a print request of document data (hereinafter, referred to as a "document A".) to the request managing unit 111 (S411). The print request includes a print condition. In FIG. 7, it is illustrated that printing of 20 papers is designated as a part of the print condition. The document data to be printed, the print condition and the like are set by an operation of the user to the application 12. Further, the request from the application 12 to the request managing unit 111 is identified by Uniform Resource Locator (URL), for example.

When the event detecting unit 131, that monitors an even regarding the application 12, detects the HTTP request (S305), the event detecting unit 131 notifies an event indicating the HTTP request to the scenario generating unit 132 (S306). The scenario generating unit 132 stores information indicating the event in the memory device 103 as a target to record in the evaluation scenario, for example. This means that the print request of a document A, the print condition included in the print request or the like are stored as a target to record in the evaluation scenario. The instruction to the application 12 by the user may be detected by the event detecting unit 131, and the content of the instruction may be stored as the target to record in the evaluation scenario.

Although step S305 is illustrated above step S411 in FIG. 7, this is just for convenience, and step S305 is performed in accordance with performing of step S411. Further, an arrow illustrating step S305 starts from the application 12, for convenience, this does not indicate that the application 12 calls the event detecting unit 131. The event detecting unit 131 detects an event regarding the application 12 via the OS or the like, for example. Thus, it is unnecessary for the application 12 to consider an existence of the evaluation scenario processing unit 130.

Meanwhile, upon receiving the print request from the application 12, the request managing unit 111 converts the request indicated by the URL to an event, and notifies the event to the response generating unit 112 (S412). In this embodiment, it is assumed that an event name of an event indicating a print request (hereinafter, referred to as a "print request event".) is "REQ_PRINT_JOB". Further, the event includes a print condition.

Subsequently, the response generating unit 112 notifies the print request event to the dispatching unit 113 (S413). Upon receiving the print request event, the dispatching unit 113 performs the event delivering process (FIG. 6). As a result, the print request event is delivered to the job managing unit 114 (S414). Here, as illustrated in FIG. 8, the print request event ("REQ_PRINT_JOB") is also delivered to the system managing unit 116, however, it is omitted in FIG. 7 for convenience.

The job managing unit 114 notifies a response event indicating that the print request event is normally received ("RES_REQUEST_RECEIVED") to the dispatching unit 113 (S415). Upon receiving the response event, the dispatching unit 113 performs the event delivering process (FIG. 6). As a result, the response event is delivered to the response generating unit 112 (S416).

After notifying the print request event to the dispatching unit 113 in step S413, the response generating unit 112 waits for an event including information necessary for a response to the print request event to be notified. For example, the response generating unit 112 may know a data structure of response information to the print request event and may ensure a memory area corresponding to the data structure in the memory device 103. The response generating unit 112 stores a value indicating the response event at a portion (corresponding variable) corresponding to the response in the memory area every time the response event is notified from the dispatching unit 113. When all of the variables that compose the memory area are fulfilled, the response generating unit 112 releases the standby state, and returns the response information stored in the memory area to the request managing unit 111.

The reason when the response generating unit 112 performs such processes is that there is a possibility that the request event notified from the response generating unit 112 to the dispatching unit 113 is delivered to a plurality of modules and response events from the plurality of modules are replayed asynchronous. For the example illustrated in FIG. 7, the response generating unit 112 returns the response information to the request managing unit 111 at timing when the response event from the job managing unit 114 is delivered to the response generating unit 112 (S417).

However, for example, when notification of statuses of the emulator unit 11 is sequentially required, the response generating unit 112 may reply the response information to the application 12 in a streaming format, without waiting.

Subsequently, the request managing unit 111 returns the HTTP response including the response information to the application 12 (S418).

Meanwhile, after notifying the response event in response to the print request event (S415), the job managing unit 114 directly notifies the print request event to the service managing unit 115 (S419). Here, the service managing unit 115 may be registered as destination to deliver for the print request event in the event delivering information storing unit 120, and the print request event may be delivered to the service managing unit 115 in addition to the job managing unit 114 from the dispatching unit 113 in step S415. In this case, step S419 may not be performed.

In response to the print request event, the service managing unit 115 starts a pseudo or virtual print (S420). The pseudo or virtual print may be actualized by updating a value of a parameter that should be changed in accordance with printing, for example. For example, the print counter is updated (incremented) at a period corresponding to print speed for each paper.

Meanwhile, the job managing unit 114 monitors the print counter. The job managing unit 114 notifies the print counter event ("JOB_PRINT_COUNTER") to the dispatching unit 113 every time the value of the print counter increases 1 (S421). Upon receiving the print counter event, the dispatching unit 113 performs the event delivering process (FIG. 6). As a result, the print counter event is delivered to the status changing unit 117 (S422).

In this embodiment, when the processes of step S421 and S422 are repeated for 10 times (in other words, when 10 papers are printed), the status changing unit 117 notifies the paper jam generating instruction event ("EMULATE_JAM_CREATE") to the dispatching unit 113 (S431). In other words, timing to notify the paper jam generating instruction event is specified based on the print counter event. Here, the status changing unit 117 may request releasing of delivering the print counter event before or after step S431 to the dispatching unit 113. As it is necessary for the status changing unit 117 to detect printing of 10 papers and it is unnecessary to deliver the print counter event after that for the status changing unit 117.

Upon receiving the paper jam generating instruction event, the dispatching unit 113 performs the event delivering process (FIG. 6). As a result, the paper jam generating instruction event is delivered to the service managing unit 115 (S432).

Upon receiving the paper jam generating instruction event, the service managing unit 115 terminates the pseudo or virtual print (S433). As a result, updating of various parameters such as the print counter or the like is terminated. Subsequently, the service managing unit 115 notifies the paper jam generating event ("SERVICE_JAM_ON") to the job managing unit 114 (S434). Upon receiving the paper jam generating event, the job managing unit 114 terminates monitoring of the print counter, for example. Subsequently, the service managing unit 115 notifies the paper jam generating event to the dispatching unit 113 (S435).

Upon receiving the paper jam generating event, the dispatching unit 113 performs the event delivering process (FIG. 6). As a result, the paper jam generating event is delivered to the status monitoring unit 118 (S436). The status monitoring unit 118 notifies the generation of a paper jam to the UI unit 119 (S437). The UI unit 119 displays a message indicating that a paper jam is generated on the display device 106, for example.

The UI unit 119 further notifies the generation of a paper jam to the scenario generating unit 132 (S307). The scenario generating unit 132 stores information indicating the generation of a paper jam in the memory device 103 as a target to record in the evaluation scenario, for example.

Subsequently, When the user who confirmed the message displayed by the UI unit 119 inputs an instruction to release the paper jam via the screen displayed on the display device 106, the UI unit 119 delivers an instruction to cancel the paper jam to the status changing unit 117 (S438). Inputting of the instruction to cancel the paper jam corresponds to a pseudo or virtual removing operation of a jammed paper.

The UI unit 119 further notifies an event indicating to cancel the paper jam to the scenario generating unit 132 (S308). The scenario generating unit 132 stores information indicating an instruction to release the paper jam in the memory device 103 as a target to record in the evaluation scenario, for example. Here, the generation of a paper jam at step S307 and the instruction to cancel the paper jam at step S308 are a pair of events. In other words, the instruction to cancel the paper jam is an instruction input by the user in response to the generation of a paper jam.

Regarding such events, the scenario generating unit 132 stores information regarding these events in association with each other such that a relationship of occurrence of a paper jam as a condition (IF statement) and an instruction to cancel the paper jam as a result (THEN statement) is retained, in the memory device 103. By generalizing, the scenario generating unit 132 stores information that is notified from the UI unit 119 based on the event delivered from the status monitoring unit 118 as information corresponding to the IF statement, and stores information that is notified from the UI unit 119 in accordance with inputting of an instruction by the user as information corresponding to the THEN statement. Whether information notified by the UI unit 119 corresponds to either of the IF statement and the THEN statement may be determined based on a content of the notified information. Alternatively, notification from the UI unit 119 may include information indicating a phenomenon (delivering of an event from the status monitoring unit 118 or inputting of an instruction by the user) that causes the notification. In this case, the scenario generating unit 132 may determine whether information notified corresponds to either of the IF statement and the THEN statement based on information indicating the phenomenon.

Upon receiving the instruction to cancel the paper jam from the UI unit 119, in response to the instruction to cancel the paper jam, the status changing unit 117 notifies the paper jam canceling instruction event ("EMULATE_JAM_RECOVER") to the dispatching unit 113 (S439). Upon receiving the paper jam canceling instruction event, the dispatching unit 113 performs the event delivering process (FIG. 6). As a result, the paper jam canceling instruction event is delivered to the service managing unit 115 (S440).

Upon receiving the paper jam canceling instruction event, the service managing unit 115 restarts the pseudo or virtual print (S441). Subsequently, the service managing unit 115 directly notifies an event indicating restarting of the print ("SERVICE_PRINT_RESUME") to the job managing unit 114 (S442). Upon receiving the event, the job managing unit 114 restarts monitoring of the print counter. As a result, processes of step S421 to S422 are repeated. Here, when the status changing unit 117 has already requested releasing of delivering the print counter event to the dispatching unit 113, step S422 is not performed.

Thereafter, after printing of 20 papers is completed, the service managing unit 115 notifies an event ("SERVICE_PRINT_END") indicating ending of print to the job managing unit 114 (S443).

Subsequently, when an instruction to terminate generating of the evaluation scenario is input by the user via the screen displayed on the display device 106, the UI unit 119 notifies termination of generating the evaluation scenario to the scenario generating unit 132 (S309).

In response to the notification, the scenario generating unit 132 generates an evaluation scenario based on information stored in the memory device 103, and stores the evaluation scenario in the evaluation scenario storing unit 140 (S310). At this time, the scenario name stored in the memory device 103 is put to the evaluation scenario. The scenario name is an example of identification data of each of the evaluation scenarios. In other words, a plurality of evaluation scenarios different from each other may be generated. The evaluation scenario may be stored as a record of a database, or may be stored as a file, for example.

FIG. 9 is a view illustrating an example of the evaluation scenario. FIG. 9 illustrates an example of an evaluation scenario n1 generated by the processes of FIG. 7.

The evaluation scenario n1 includes the scenario name at first line. Subsequent lines are described in a format of "<line number>:<unit that notified it>:<content of event>". The line number indicates an order that the event is generated. The unit that notified it indicates a unit that notified the event. "UI" indicates the UI unit 119 and "EVENT" indicates the event detecting unit 131. The content of event indicates a content of the event. Line 1 is recorded in accordance with step S303. A value of "N" of line "N" is line number attached in the evaluation scenario n1. Line 2 is recorded in accordance with step S304. Line 3 is recorded in accordance with step S306. Line 4 is recorded in accordance with steps S307 and S308. In other words, the IF statement at line 4 is recorded in accordance with step S307 and the THEN statement at line 4 is recorded in accordance with step S308. Here, at line 4, the unit that notified the event is omitted. This is because it is clear that the unit that notified the event for the IF statement of an IF-THEN statement is the UI unit 119.

In FIG. 7, the application 12 may be mounted such that to monitor the status of the job after receiving a response in step S418. In this case, the user can confirm whether the application 12 is operated as expected in accordance with the generation of a paper jam or releasing of the paper jam. Alternatively, the application 12 for which the operation is tested may be different from the application illustrated in FIG. 7. In other words, when the application 12 illustrated in FIG. 7 is performing printing and a paper jam is generated while printing, whether an influence by a paper jam is as expected for the application 12, for which the operation is tested, that is operated in parallel may be confirmed.

Further, FIG. 7 illustrates process steps for a single scenario, and the process steps capable of being performed by the data processing apparatus 10 of the embodiment are not limited to those illustrated in FIG. 7. For example, the status changing unit 117 may generate various phenomenon that may happen in the target device such as running out of toner, running out of paper or the like. Further, the request from the application 12 is not limited to the print request. The request managing unit 111 is capable of receiving various requests that may be receivable via the API (in other words, the API provided by the application platform of the target device) of the request managing unit 111.

Figure 10:
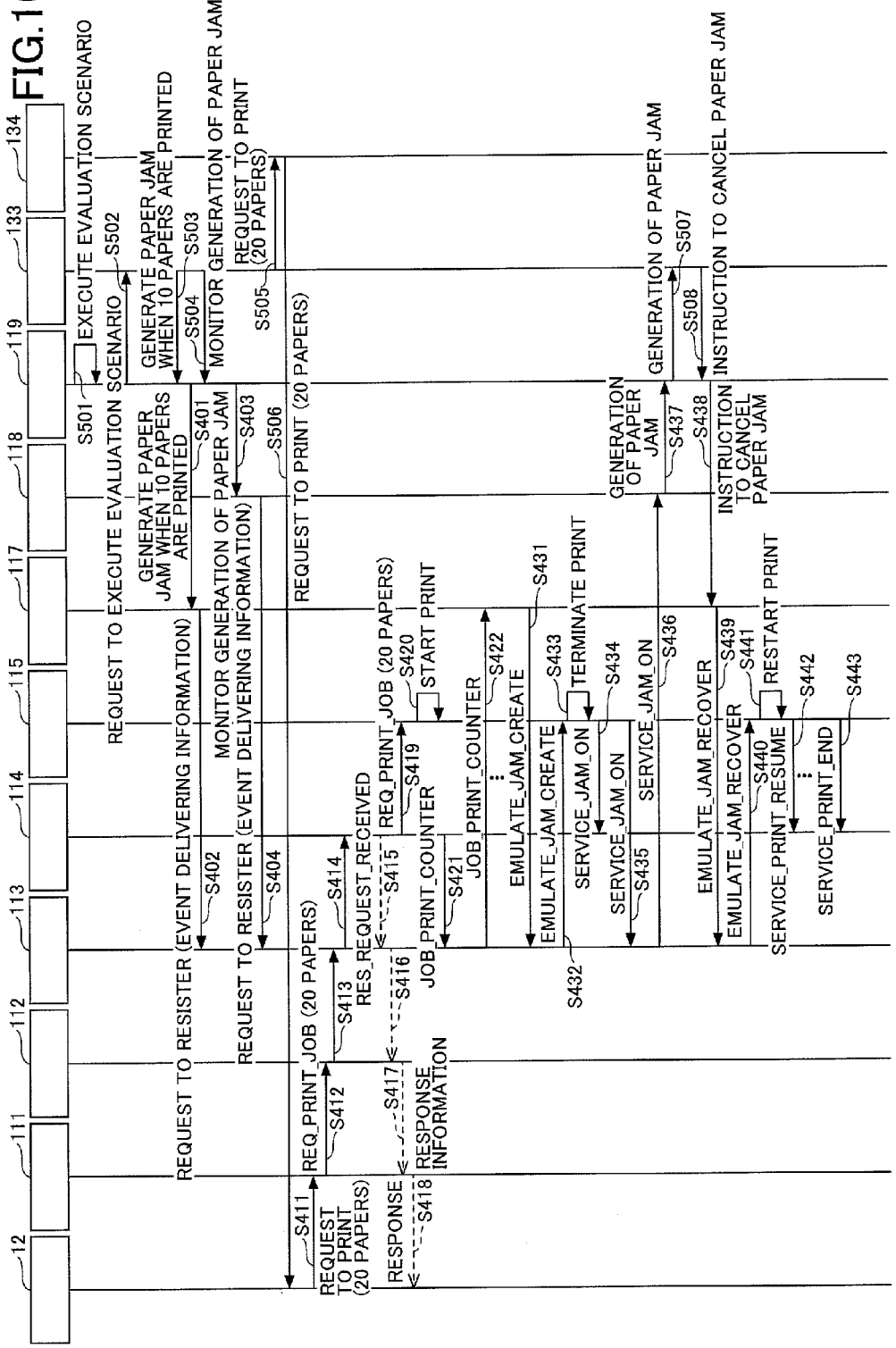
FIG. 10 is a sequence diagram for explaining an example of process steps that are performed when executing the evaluation scenario in the first embodiment.

Subsequently, process steps when the evaluation scenario is executed are explained. FIG. 10 is a sequence diagram for explaining an example of process steps that are performed when executing the evaluation scenario in the first embodiment. In FIG. 10, the same steps as those of FIG. 7 are given the same reference step numbers, and explanations are not repeated. In FIG. 10, different series of step numbers are given for steps (S501 to S508) regarding the evaluation scenario processing unit 130 and steps (S401 to S443) not regarding the evaluation scenario processing unit 130, for convenience. Further, although boxes of units are given only numerals and names of the units are not illustrated in the boxes in FIG. 10, the boxes with numerals correspond to the units as illustrated in FIG. 2 and described in the specification.

For example, when an instruction to execute the evaluation scenario is input by the user via the screen displayed on the display device 106 (S501), the UI unit 119 notifies the instruction to execute to the scenario executing unit 133 (S502). The instruction to execute includes a scenario name of a target evaluation scenario to be executed. The scenario executing unit 133 obtains the evaluation scenario corresponding to the scenario name from the evaluation scenario storing unit 140 and starts executing the obtained evaluation scenario. Here, it is assumed that the evaluation scenario n1 illustrated in FIG. 9 is the target to be executed.

First, the scenario executing unit 133 inputs, based on the description of the evaluation scenario n1 at line 1, an instruction to generate a paper jam when 10 papers are printed in the UI unit 119 (S503). In response to the instruction from the scenario executing unit 133, processes of step S401 and S402 are performed. The unit to input the instruction based on each line of the evaluation scenario n1 is specified based on the unit that notified the event in the respective line. In other words, an instruction based on the description of a line including "UI" is input in the UI unit 119 and an instruction based on the description of a line including "EVENT" is input in the pseudo-event generating unit 134.

Subsequently, the scenario executing unit 133 inputs, based on the description of the evaluation scenario n1 at line 2, a monitoring instruction of the generation of a paper jam in the UI unit 119 (S504). In response to the instruction from the scenario executing unit 133, processes of step S403 and S404 are performed.

Subsequently, the scenario executing unit 133 inputs, based on the description of the evaluation scenario n1 at line 3, an instruction to generate a print request event for the document A in the pseudo-event generating unit 134 (S505). The instruction to generate includes a print condition regarding the print request. The pseudo-event generating unit 134 spuriously generates an event indicating a print request based on the instruction to generate (S506). The spurious generation of the event may be actualized by calling an API of the request managing unit 111, or spuriously generating an event corresponding to an instruction to the application by the user, for example. For the former case, processes of step S412 to S436 are performed in accordance with the events. For the latter case, processes of step S411 to S436 are performed in accordance with the events.

The scenario executing unit 133 waits for executing line 4 of the evaluation scenario n1 until the condition indicated by the IF statement is satisfied.

Thereafter, when the generation of a paper jam is notified from the UI unit 119 in response to step S437 (S507), the scenario executing unit 133 determines whether the generation of a paper jam satisfies the condition of the IF statement at line 4 of the evaluation scenario n1. As the generation of a paper jam satisfies the IF statement at line 4, the scenario executing unit 133 inputs the instruction to cancel the paper jam in the UI unit 119 based on the THEN statement at line 4 (S508). In accordance with the instruction to cancel, step S438 to S443 are performed.

As described above, according to the first embodiment, the user can forcibly, at desired timing, change the status of the emulator unit 11 via the UI unit 119 and the status changing unit 117. Thus, the user can easily replay various statuses that may occur in the target device, and perform a test of the operation of the application 12 or the like at the statuses.

Further, delivering of the event from each of the modules is relayed by the dispatching unit 113 based on the information stored in the event delivering information storing unit 120. Thus, a necessity can be reduced to change or the like of a source code of each of the modules in accordance with the change or the like of the destination to deliver for the event.

Further, according to the first embodiment, the event that is generated when performing the test of the operation of the application 12 can be recorded in the evaluation scenario, and the event recorded in the evaluation scenario can be replayed. As a result, regarding the test of the operation of the application 12, an operation burden for the user can be reduced when repeating the scenario.

Next, the second embodiment is explained. In the second embodiment, points different from those of the first embodiment are explained. Thus, point that are not particularly mentioned may be the same as those of the first embodiment.

Figure 11:
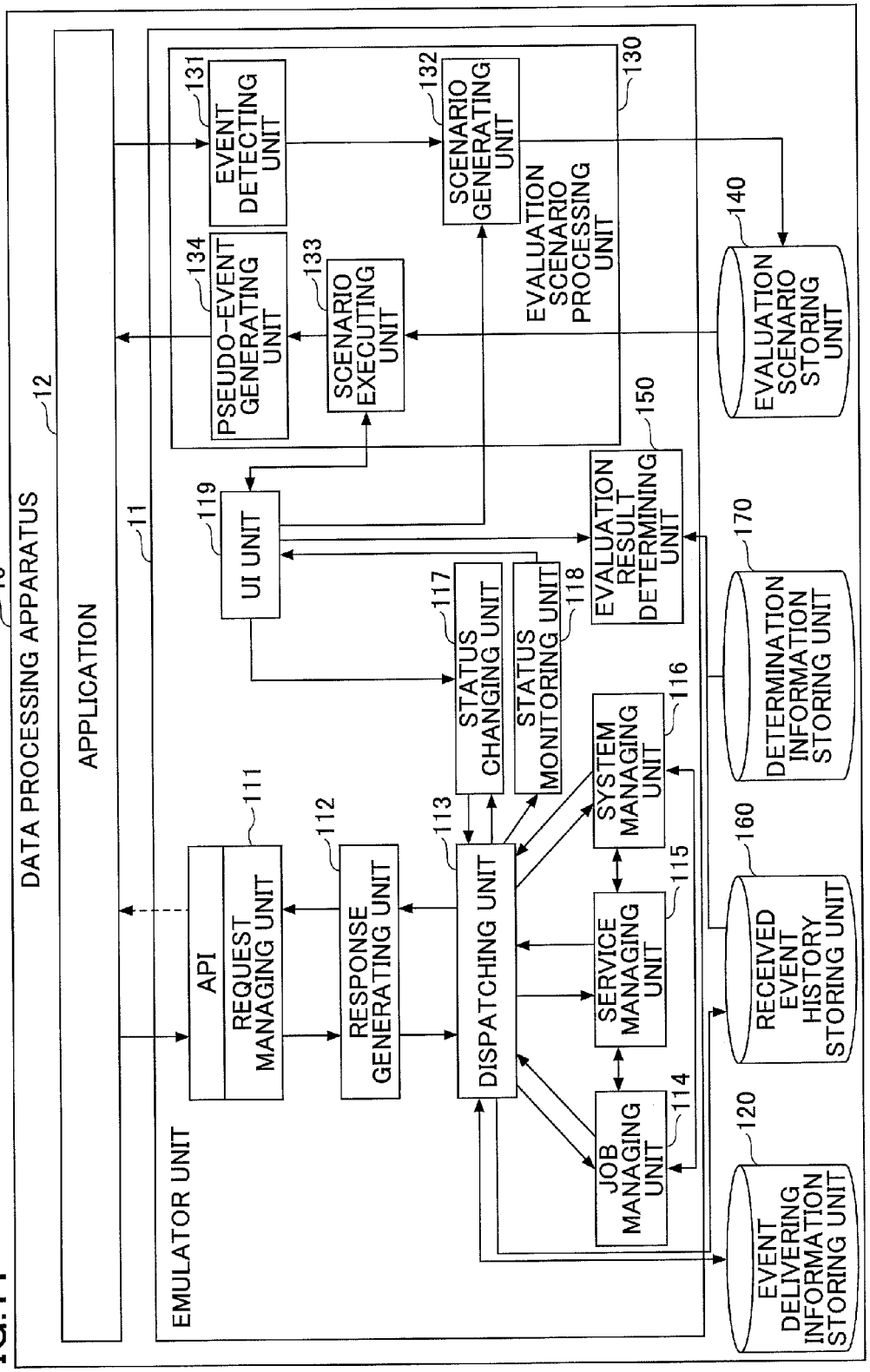
FIG. 11 is a view illustrating an example of a functional structure of a data processing apparatus of a second embodiment.

FIG. 11 is a view illustrating an example of a functional structure of the data processing apparatus 10 of the second embodiment. In FIG. 11, the same components as those of FIG. 2 are given the same reference numerals, and explanations are not repeated.

In FIG. 11, the emulator unit 11 further includes an evaluation result determining unit 150. The evaluation result determining unit 150 determines right and wrong of the executed result of the evaluation scenario. The status in which the executed result of the evaluation scenario is right means that process steps performed by the emulator unit 11 in accordance with execution of the evaluation scenario are as expected. The status in which the executed result of the evaluation scenario is wrong means that process steps performed by the emulator unit 11 in accordance with execution of the evaluation scenario are different from the expected steps.

The data processing apparatus 10 further uses a received event history storing unit 160 and a determination information storing unit 170. Each of these storing units may be actualized by the auxiliary storage device 102, a storage device that is connected to the data processing apparatus 10 via a network, or the like, for example.

When executing the evaluation scenario, the received event history storing unit 160 stores history of events for which the dispatching unit 113 receives notification in time series. The determination information storing unit 170 stores events in time series that should be notified to the dispatching unit 113 in accordance with the execution of the evaluation scenario. In other words, the determination information storing unit 170 stores information that should be stored in the received event history storing unit 160 when the executed result of the evaluation scenario is right (hereinafter, referred to as "determination information".).

In other words, in this embodiment, right and wrong of the executed result of the evaluation scenario is determined based on the history of the events notified to the dispatching unit 113. This is because as all of the events except events that are directly notified between the job managing unit 114, the service managing unit 115 and the system managing unit 116 are aggregated to the dispatching unit 113, it is possible to estimate process steps performed by the emulator unit 11 by referring to the history of the events notified to the dispatching unit 113. The determination information storing unit 170 may store determination information for each of the evaluation scenarios. For example, the determination information regarding the evaluation scenario may be stored in association with the scenario name of the evaluation scenario. Further, the determination information may be generated by a generator (engineer) or the like of the evaluation scenario, for example.

Figure 12:
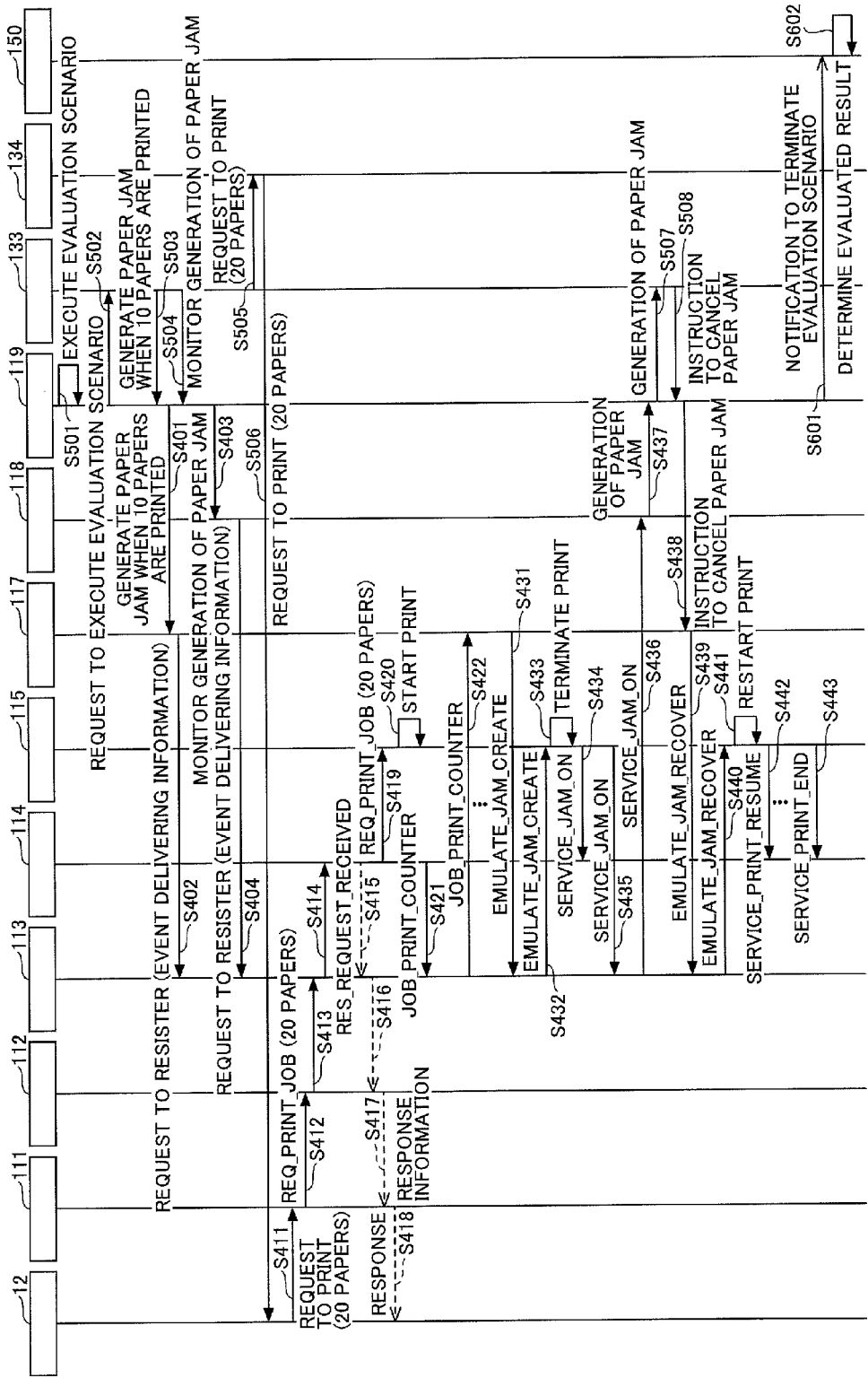
FIG. 12 is a sequence diagram illustrating an example of process steps that are executed when executing the evaluation scenario in the second embodiment.

FIG. 12 is a sequence diagram illustrating an example of process steps that are executed when executing the evaluation scenario in the second embodiment. In FIG. 12, the same steps as those of FIG. 10 are given the same reference step numbers, and explanations are not repeated. Further, although boxes of units are given only numerals and names of the units are not illustrated in the boxes in FIG. 12, the boxes with numerals correspond to the units as illustrated in FIG. 2 and described in the specification.

In FIG. 12 as well, the evaluation scenario n1 illustrated in FIG. 9 is a target to be executed. In this case, the request or the event is notified to the dispatching unit 113 at steps S402, S404, S413, S415, S421, S431, S435 and S439. The dispatching unit 113 stores log data (history data) of the received request or the event in each of these steps in time series in the received event history storing unit 160. As a result, at the end of executing the evaluation scenario n1, information as illustrated in FIG. 13 is stored in the received event history storing unit 160.

FIG. 13 is a view illustrating an example of information stored in the received event history storing unit 160. In FIG. 13, the requests or the events received by the dispatching unit 113 at steps S402, S404, S413, S415, S421, S431, S435 and S439 are illustrated in time series (an order of these steps). Although an example is illustrate in which information (requests of registering the event delivering information at lines 1 and 2 in FIG. 13, for example) that are not targets to be delivered by the dispatching unit 113 are also stored in the received event history storing unit 160 in this embodiment, only an event that is a target to be delivered by the dispatching unit 113 may be stored in the received event history storing unit 160. In this case, the history of the events that are targets to be delivered by the dispatching unit 113 may be set as determination information.

Thereafter, upon detecting the termination of the evaluation scenario n1, the UI unit 119 notifies the termination of the execution of the evaluation scenario n1 to the evaluation result determining unit 150 (S601). At this time, the scenario name of the evaluation scenario n1 may be notified from the UI unit 119 to the evaluation result determining unit 150.

In response to the notification, the evaluation result determining unit 150 determines right and wrong of the executed result of the evaluation scenario n1 (S602). For example, the evaluation result determining unit 150 obtains determination information in association with the scenario name of the evaluation scenario n1 from the determination information storing unit 170. Further, the evaluation result determining unit 150 obtains information stored in the received event history storing unit 160. The evaluation result determining unit 150 checks the obtained two information and determines that the executed result of the evaluation scenario n1 is right when the two information match. When the two information are different, the evaluation result determining unit 150 determines that the executed result of the evaluation scenario n1 is wrong. In this embodiment, as the emulator unit 11 performs as expected, the content of the determination information is the same as that illustrated in FIG. 13. Thus, it is determined that the executed result of the evaluation scenario n1 is right.

The evaluation result determining unit 150 may display the determined result or may store the determined result in the auxiliary storage device 102. The user can confirm right and wrong of the operation of the application 12 by referring to the determined result.

As described above, according to the second embodiment, right and wrong of the executed result of the evaluation scenario n1 can be easily confirmed. Thus, by performing the second embodiment at a specialized agency that evaluates a quality of the application 12, for example, an evaluation operation for a large number of application 12 can be efficiently performed.

Although an example is explained in the embodiments in which the device (target device) emulated by the emulator unit 11 is an image forming apparatus, a device other than an image forming apparatus such as a projector, a video conference system, a digital camera or the like may be a target to be emulated by the emulator unit 11.

Further, the functions of the data processing apparatus 10 of the embodiment may be provided as services that are used via a network such as a cloud service, a service provided by an Application Service Provider (ASP), a Web service or the like. In this case, the application 12 may be provided at a PC (Personal Computer) or the like at a user side that is connected to the data processing apparatus 10 via the network, or may be uploaded to the data processing apparatus 10.

In each of the above embodiments, the data processing apparatus 10 is an example of a data processing apparatus and a data processing system. The request managing unit 111 is an example of a request receiving unit. The emulator unit 11 is an example of an emulating unit. The UI unit 119 is an example of an instruction receiving unit and a user notifying unit. The scenario generating unit 132 is an example of a storing processing unit. The scenario executing unit 133 is an example of a replaying unit. The evaluation scenario storing unit 140 is an example of a first storing unit. The dispatching unit 113 is an example of a delivering unit. The event delivering information storing unit 120 is an example of a second storing unit. The job managing unit 114 and the service managing unit 115 are an example of a component unit. The evaluation result determining unit 150 is an example of a determining unit.

The individual constituents of the data processing apparatus 10 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

A technique capable of easily replaying various statuses of a target device to emulate is provided.

Although a preferred embodiment of the data processing apparatus and the data processing method has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The present application is based on and claims the benefit of priority of Japanese Priority Application No. 2014-188556 filed on Sep. 17, 2014 and Japanese Priority Application No. 2015-023175 filed on Feb. 9, 2015, the entire contents of which are hereby incorporated by reference.

What is claimed is:

1. A data processing method executed by a computer, comprising:
    a step of receiving a request from a program that causes a device to perform a predetermined process by a request receiving unit of the computer;
    a step of emulating a process performed by the device in accordance with the request by an emulating unit of the computer;
    a step of receiving an instruction to change a status of the emulating unit from a user by an instruction receiving unit of the computer;
    a step of causing the emulating unit to change the status in accordance with the instruction to change the status by a status changing unit of the computer;
    a step of monitoring the status of the emulating unit;
    a step of storing, in response to generation of the request received by the request receiving unit or generation of the instruction to change received by the instruction receiving unit, information indicating the request or information indicating the instruction to change in a first storing unit by a storing processing unit of the computer, and
    a step of replaying inputting the request indicated by information stored in the first storing unit in the request receiving unit or inputting the instruction to change indicated by information stored in the first storing unit in the instruction receiving unit by a replaying unit of the computer,
    wherein the emulating unit emulates the process performed by the device under a status changed by the status changing unit,
    wherein the step of causing the emulating unit requests to register a destination to deliver a notification of an event corresponding to each event, and requests to register the status changing unit itself as a destination to deliver a notification of an event, and
    wherein the step of monitoring the status of the emulating unit requests to register a destination to deliver a notification of an event corresponding to each event, and requests to register the status monitoring unit itself as a destination to deliver a notification of an event.

2. The data processing method according to claim 1,
    wherein the storing processing unit stores information indicating a phenomenon that is generated while the emulating unit emulates the process performed by the device, and information indicating an instruction to change a status of the emulating unit received by the instruction receiving unit in response to generation of the phenomenon in association with each other, and wherein the replaying unit inputs, in accordance with a phenomenon generated while the emulating unit emulates the process performed by the device, in response to replaying of inputting the request indicated by information stored in the first storing unit in the request receiving unit or inputting the instruction to change indicated by information stored in the first storing unit in the instruction receiving unit, the instruction to change indicated by information stored in the first storing unit in association with the information indicating the phenomenon, in the instruction receiving unit.

3. The data processing method according to claim 1, further comprising:
a step of delivering information regarding a phenomenon that is generated while the emulating unit emulates the process performed by the device to the status changing unit by a delivering unit of the computer,
wherein the status changing unit causes the emulating unit to change a status in accordance with the instruction to change at timing specified based on information delivered from the delivering unit.

4. The data processing method according to claim 3,
wherein the emulating unit includes a plurality of component units,
wherein in the step of delivering, a request received by the request receiving unit is delivered to a component unit specified by referring to a second storing unit that stores information indicating a target request to be delivered to each of the component units.

5. The data processing method according to claim 3, further comprising:
a step of determining whether history of information regarding the target phenomenon to be delivered by the delivering unit matches information that is previously generated as a matching object regarding the history.

6. The data processing method according to claim 3,
wherein in the step of delivering, by referring to a second storing unit that stores information indicating a target phenomenon to be delivered to the status changing unit, information regarding a specific phenomenon to the status changing unit among phenomenon that are generated while the emulating unit emulates the process performed by the device in accordance with the request is delivered.

7. The data processing method according to claim 1, further comprising:
a step of notifying information regarding a phenomenon that is generated while the emulating unit emulates the process performed by the device by a user notifying unit of the computer.

8. A data processing apparatus comprising:
a memory that stores a program; and
a processor that is configured to execute the program so as to:
receive a request from a program that causes a device to perform a predetermined process;
emulate a process performed by the device in accordance with the request;
receive an instruction to change a status of the processor from a user;
change the status in accordance with the instruction to change the status;
monitor the status of the processor;
store, in response to generation of the request received by the processor or generation of the instruction to change received by the processor, information indicating the request or information indicating the instruction to change in a first storing unit, and
replay inputting the request indicated by information stored in the first storing unit in the processor or inputting the instruction to change indicated by information stored in the first storing unit in the processor,
wherein the processor emulates the process performed by the device under a status changed by the processor,
wherein the processor is configured to request to register a destination to deliver a notification of an event corresponding to each event, and request to register the processor itself as a destination to deliver a notification of an event, and
wherein the processor is configured to request to register a destination to deliver a notification of an event corresponding to each event, and request to register the processor itself as a destination to deliver a notification of an event.

9. The data processing apparatus according to claim 8,
wherein the processor unit stores information indicating a phenomenon that is generated while the processor emulates the process performed by the device, and information indicating an instruction to change a status of the processor received by the processor in response to generation of the phenomenon in association with each other, and
wherein the processor inputs, in accordance with a phenomenon generated while the processor emulates the process performed by the device, in response to replaying of inputting the request indicated by information stored in the first storing unit in the processor or inputting the instruction to change indicated by information stored in the first storing unit in the processor, the instruction to change indicated by information stored in the first storing unit in association with the information indicating the phenomenon, in the processor.

10. The data processing apparatus according to claim 8, wherein the processor:
delivers information regarding a phenomenon that is generated while the processor emulates the process performed by the device to the processor,
wherein the processor changes a status in accordance with the instruction to change at timing specified based on information delivered from the processor.

11. The data processing apparatus according to claim 10,
wherein the processor delivers, by referring to a second storing unit that stores information indicating a target phenomenon to be delivered to the processor, information regarding a specific phenomenon to the processor among phenomenon that are generated while the processor emulates the process performed by the device in accordance with the request.

12. The data processing apparatus according to claim 10,
wherein the processor includes a plurality of component units,
wherein the processor delivers a request received by the processor to a component unit specified by referring to a second storing unit that stores information indicating a target request to be delivered to each of the component units.

13. The data processing apparatus according to claim 10, wherein the processor:
determines whether history of information regarding the target phenomenon to be delivered by the processor matches information that is previously generated as a matching object regarding the history.

14. The data processing apparatus according to claim 8, wherein the processor:
  notifies information regarding a phenomenon that is generated while the processor emulates the process performed by the device.

15. The data processing apparatus according to claim 8, wherein the processor registers the processor itself as a destination to deliver a notification of an event indicating a timing of a predetermined event, and
  wherein the processor registers the status monitoring unit itself as a destination to deliver a notification of an event indicating a predetermined state.

16. A non-transitory computer readable medium that stores a program product for being executed on a computer to cause the computer to execute a data processing method comprising:
  a step of receiving a request from a program that causes a device to perform a predetermined process;
  a step of emulating a process performed by the device in accordance with the request;
  a step of receiving an instruction to change a status of the computer from a user;
  a step of causing the computer to change the status in accordance with the instruction to change the status;
  a step of monitoring the status of the computer;
  a step of storing, in response to generation of the request received by the computer or generation of the instruction to change received by the computer, information indicating the request or information indicating the instruction to change in a first storing unit, and
  a step of replaying inputting the request indicated by information stored in the first storing unit in the computer or inputting the instruction to change indicated by information stored in the first storing unit in the computer,
wherein the method further includes:
emulating the process performed by the device under a status changed,
requesting to register a destination to deliver a notification of an event corresponding to each event, and requesting to register the computer itself as a destination to deliver a notification of an event, and
requesting to register a destination to deliver a notification of an event corresponding to each event, and requests to register the computer itself as a destination to deliver a notification of an event.

* * * * *